United States Patent
Sugiyama et al.

(10) Patent No.: US 6,817,310 B2
(45) Date of Patent: Nov. 16, 2004

(54) DIAL PLATE, ITS MANUFACTURING METHOD, METER USING THE SAME, IN-VEHICLE STATUS INDICATOR AND METER USING THE SAME

(75) Inventors: Tetsuya Sugiyama, Shizuoka (JP); Yoshiyuki Furuya, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/326,415

(22) Filed: Dec. 23, 2002

(65) Prior Publication Data

US 2003/0116079 A1 Jun. 26, 2003

(30) Foreign Application Priority Data

Dec. 26, 2001 (JP) .................................. 2001-393554
Jan. 29, 2002 (JP) .................................. 2002-020266
Feb. 8, 2002 (JP) .................................. 2002-032117

(51) Int. Cl.$^7$ .................... G01D 11/28; G02F 1/1347
(52) U.S. Cl. .................... 116/62.4; 116/286; 362/23
(58) Field of Search ...................... 116/300, 28.1, 116/62.1, 62.4, 202, 284, 286–288, 302, 305, DIG. 5–6, DIG. 36; 362/23, 26–28

(56) References Cited

U.S. PATENT DOCUMENTS

| 5,404,277 | A | * | 4/1995 | Lindblad | 362/31 |
| 5,537,236 | A | * | 7/1996 | Young | 349/139 |
| 5,949,346 | A | * | 9/1999 | Suzuki et al. | 340/815.45 |
| 6,317,110 | B1 | * | 11/2001 | Brandt | 345/87 |
| 6,511,194 | B1 | * | 1/2003 | Noll et al. | 362/23 |
| 6,522,381 | B1 | * | 2/2003 | Brandt | 349/142 |
| 6,674,497 | B2 | * | 1/2004 | Brandt | 349/74 |
| 2003/0221606 | A1 | * | 12/2003 | Quigley et al. | 116/286 |

* cited by examiner

*Primary Examiner*—Christopher W. Fulton
*Assistant Examiner*—Tania C. Courson
(74) *Attorney, Agent, or Firm*—Armstrong, Kratz, Quintos, Hanson & Brooks, LLP.

(57) ABSTRACT

A dial plate includes a substrate having a curve with an opening formed at the center; and an indicating member attached onto the curve of the substrate. The indicating member is a planar ring-shaped transparent resin film having an indicating portion with a scale consisting of characters and symbols and a recess portion formed partially. In this configuration, the dial plate can provide a new shape with a scale indication with a sense of depth. A meter including such a dial plate can be also provided.

19 Claims, 10 Drawing Sheets

DIAL PLATE, ITS MANUFACTURING METHOD, METER USING THE SAME, IN-VEHICLE STATUS INDICATOR AND METER USING THE SAME

BACKGROUND OF THE INVENTION

1. Field of the Invention

This invention relates to a dial plate for various meters installed on a motor vehicle, its manufacturing method, a meter using the dial plate, an in-vehicle status indicator and a meter using the indicator.

2. Description of the Related Art

For example, the dial plate of an in-vehicle status indicator for various meters installed on a motor vehicle is constructed in such a fashion that a bright colored (e.g. white) transparent layer is applied on the one side of a transparent or semi-transparent plate-like substrate by screen printing means, and dark-colored printed opaque layer is formed except a contour of a scale or digits on the surface of the colored layer by the same printing means so that in the daytime, the scale and digits provided on the dial plate can be visually recognized by reflecting light, and at night, these scale and digits are illuminated with the light from a light source arranged on the rear side of the dial plate.

Meanwhile, when the dial plate is manufactured, the screen printing must be carried out to form the transparent colored layer and opaque printed layer so that the substrate used must be planar. Owing to this, it is difficult to carry out the screen printing on the substrate which is formed in a three-dimensional shape. For example, it was difficult to manufacture the three-dimensional dial plate with a sense of depth.

In order to manufacture the three-dimensional dial plate, it can be proposed to press-mold the dial plate so as to be three-dimensional after the transparent colored layer and the opaque printed layer have been formed. In this case, the press-molding is carried out after the screen printing so that production cost of the dial plate will be increased.

A first object of this invention is to provide a dial plate which can give a three-dimensional new shape at low cost, its manufacturing method and a meter using the dial plate.

Figure 17:
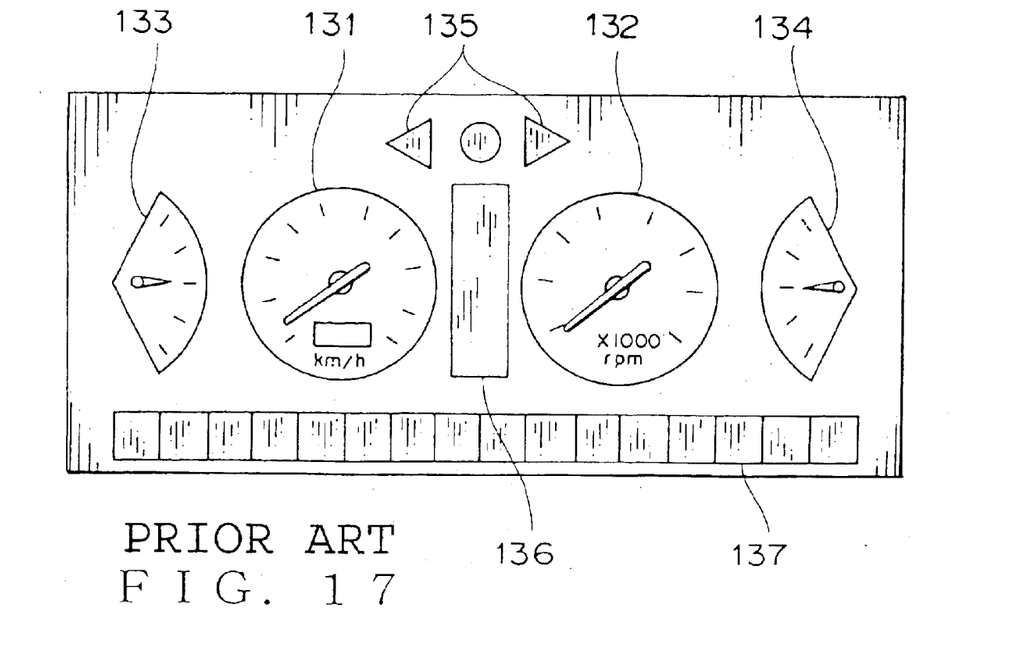
FIG. 17 is a view of a conventional in-vehicle status indicator.

Meanwhile, an in-vehicle status indicator as shown in FIG. 17 has been proposed to indicate many statuses of the vehicle collectively. This indicator includes various meters such as a speed meter 131 for indicating the running speed of a motor vehicle, a tachometer 132 for indicating the rotary speed of an engine, a fuel meter 133 for indicating the remaining level of fuel, etc.; a thermometer 134; a direction indicator 135; a transmission shift position indicator 136; and a warning indicator for lighting a warning light when the vehicle is out of order. These elements are arranged at different positions.

In this status indicator, however, the place of the indication a driver wants to confirm must be searched from various kinds of status indications. This is troublesome. In addition, since the respective status indications are arranged at different positions, the status indicator occupies a large space.

In view of such a problem, a second object of this invention is to provide an in-vehicle status indicator which requires a small space and a meter provided with such an indicator.

SUMMARY OF THE INVENTION

In order to attain the above first object, there is a method of manufacturing a dial plate comprising the steps of:

preparing a substrate having a curve with an opening formed at the center; and attaching an indicating member onto the curve of the substrate, wherein the indicating member is a planar ring-shaped transparent resin film having an indicating portion with a scale consisting of characters and symbols and a recess portion formed partially.

In this configuration, the dial plate having a new three-dimensional shape with a scale indication with a stereognostic sense can be easily manufactured at low cost.

There is provided a dial plate comprising:

a substrate having a curve with an opening formed at the center; and an indicating member attached onto the curve of the substrate, wherein the indicating member is a planar ring-shaped transparent resin film having an indicating portion with a scale consisting of characters and symbols and a recess portion formed partially.

In this configuration, the dial plate having a new three-dimensional shape with a scale indication with a sense of depth can be easily provided at low cost.

In the dial plate, preferably, the curve is conical. In this configuration, the dial plate can have a scale indication with a sense of depth in a three-dimensional shape.

Further, there is provided a meter comprising:

a dial plate described above and a needle having a tip bent to match the curve and driven by a movement.

In this configuration, the meter can have a new three-dimensional shape with a scale indication with a sense of depth.

In order to attain the above second object, there is provided an in-vehicle status indicator comprising:

a transmission LCD panel;

a transmission backlight unit for illuminating the transmission LCD panel, which is arranged on the rear side of the transmission LCD panel;

a warning indicating portion arranged on the rear side of the backlight unit; and a warning light source arranged on the warning indicating unit.

In this configuration, the space required for indication can be reduced.

Preferably, the in-vehicle status indicator further comprises a control means for controlling the transmission backlight unit and the warning light source so that while the transmission LCD panel is used, the transmission backlight unit is "on" and the warning light source is "off" and while the while the warning display section is used, the transmission backlight unit is "off" and the warning light source is "on".

In this configuration, since different status indications are made on the same position, user can easily recognize each status indication.

In the in-vehicle status indicator, preferably, the backlight unit comprises a light conducting plate, a light source for illuminating an edge of the light conducting plate and a reflector arranged around the light source.

In this configuration, backlighting based on the plane light on the transmission LCD panel can be made.

In order to attain the second object, there is also provided a meter comprising:

a dial plate having a indicating portion on which a scale composed of characters and symbols is indicated, and an in-vehicle status indicator as claimed in claim 1, which is centrally arranged on the indicating portion.

In this configuration, the space required for indication is reduced, and since different status indications are made on the same position, a user can easily recognize each status indication.

In the meter, preferably, the indicating portion is conical. In this configuration, new meter indication can be made.

In order to attain the second object, there is also provided a meter comprising:

a dial plate having a indicating portion on which a scale composed of characters and symbols is indicated;

a needle arranged on the front side of the indicating portion;

a warning indicating portion centrally arranged on the indicating portion; and a warning light source arranged on the rear side of the warning indicating portion;

a transmission backlight unit arranged on the front side of the warning display section and the needle; and a transmission LCD panel arranged on the front side of the transmission backlight unit, which is illuminated with the transmission backlight unit.

In this configuration, the space required for indication can be reduced.

Preferably, the meter further comprises a control means for controlling the transmission backlight unit and the warning light source so that while the transmission LCD panel is used, the transmission backlight unit is "on" and the warning light source is "off" and while the while the warning display section is used, the transmission backlight unit is "off" and the warning light source is "on".

In this configuration, since different status indications are made on the same position, a user can easily recognize each status indication.

Preferably, the meter further comprises a cover with an indicating window through which indications on the warning display section and on the transmission LCD panel are visually recognized, the cover being arranged on the front side of the transmission LCD panel.

In order to attain the second object, there is also provided a meter comprising:

a dial plate having a indicating portion on which a scale composed of characters and symbols is indicated;

a needle arranged on the front side of the indicating portion;

a warning indicating unit centrally arranged on the front side of the indicating portion and on the front side of the needle; and a LCD unit arranged on the front side of the warning displaying unit.

In this configuration, the space required for indication can be reduced.

In the meter, preferably, the warning displaying unit includes:

a light source plate equipped with a warning light source;

a reflecting member for reflecting light from the light emitted from the warning light source, the reflecting member being arranged on the front side of the light source plate and equipped with an opening in which the warning light source can be inserted;

a warning pattern arranged on the front side of the reflecting member and equipped with a warning workpiece for receiving the light reflected from the reflecting member; and a case for securing the light source plate, the reflecting member and the warning pattern.

In this configuration, the warning indicating unit, which has an individual structure, can be easily assembled. Since the warning indicating unit is arranged in front of the needle, the warning workpiece can be arranged so that they can be visually recognized within an entire display area inclusive of the area in the vicinity of the rotary shaft of the needle.

In the meter, preferably, the warning light source is an LED, the LED being oriented to emit the light in a direction in parallel to a attaching plane of the light source substrate and the reflecting member has a reflecting face which slopes from the rear side to the front side and is mat-finished, the reflecting face being formed on the tip side of the LED when inserted in the opening.

In this configuration, since the warning indicating unit can be made thin, the distance between the conical display section of the dial plate and the LCD display unit is shortened. Therefore, the visibility will not be lowered owing to an increase in the distance.

In the meter, preferably, an entirety of the reflecting member or at least the inner wall of the opening and the reflecting face are coated with white paint.

In this configuration, the warning workpiece can be illuminated with the plane light reflected from the reflecting face.

In the meter, preferably, the LCD unit comprises:

a transmission backlight unit;

a transmission LCD panel which is arranged on the front side of the transmission backlight unit and illuminated with the transmission backlight unit; and a cover for fixing the transmission backlight unit and the transmission LCD panel, which is equipped with a display window through which the indication on the transmission LCD panel is visually recognized.

In this configuration, the LCD unit, which has an individual structure composed of elements for LCD, can be easily assembled.

Preferably, the meter further comprises a control means for controlling the transmission backlight unit and the warning light source so that while the transmission LCD panel is used, the transmission backlight unit is "on" and the warning light source is "off" and while the while the warning display section is used, the transmission backlight unit is "off" and the warning light source is "on".

In this configuration, since different status indications are made on the same position, a user can easily recognize each status indication.

In the meter, preferably, the indicating portion is conical, and a tip of the needle has a shape bent to match a slope of the indicating portion.

In this configuration, new meter indication can be made.

The above and other objects and features of the invention will be more apparent from the following description taken in conjunction with the accompanying drawings.

DESCRIPTION OF THE PREFERRED EMBODIMENTS

Referring to the drawings, an explanation will be given of various embodiments of this invention based on the first aspect and second aspect in order to attain the first object and the second object of this invention.

Aspect I

An explanation will be given of various embodiments according to the first aspect of this invention.

Figure 1:
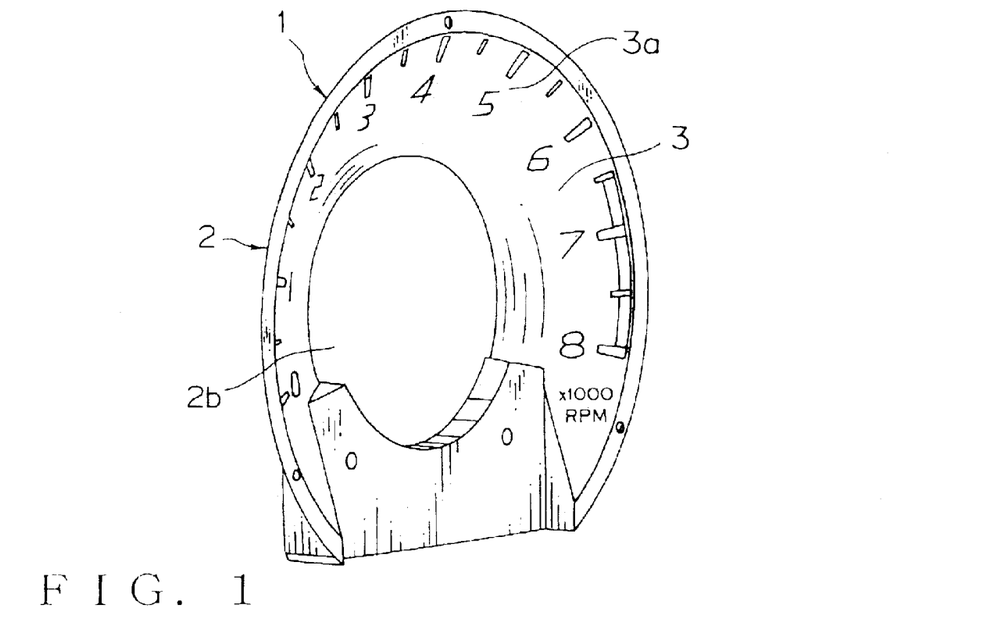
FIG. 1 is a perspective view of an embodiment of the dial plate according to this invention.
Figure 2:
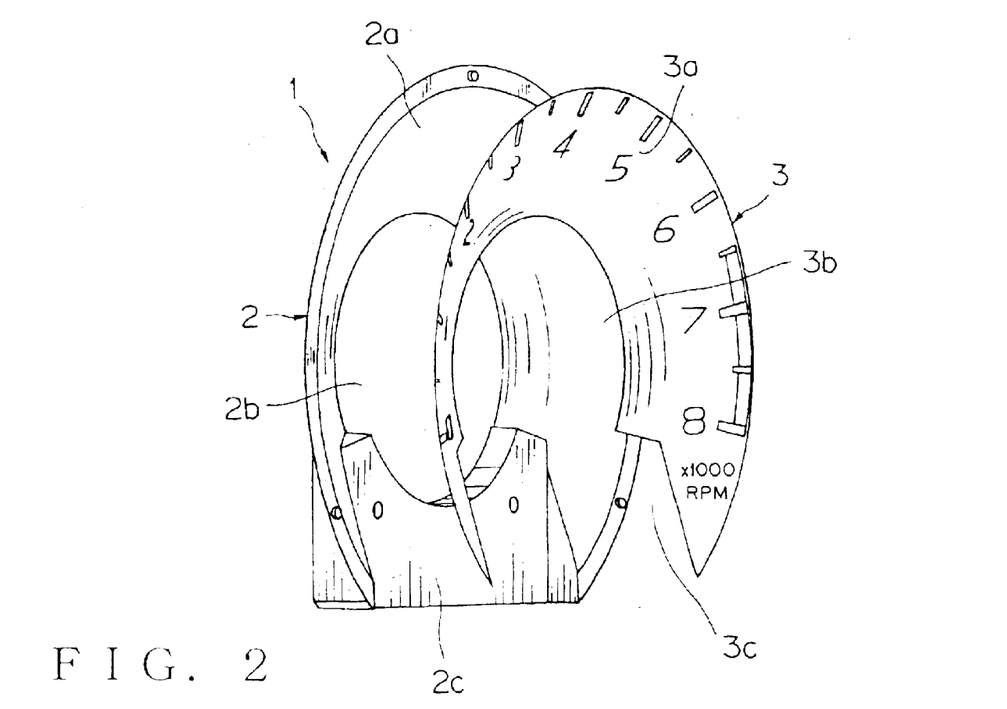
FIG. 2 is an exploded perspective view of the dial plate.
Figure 3:
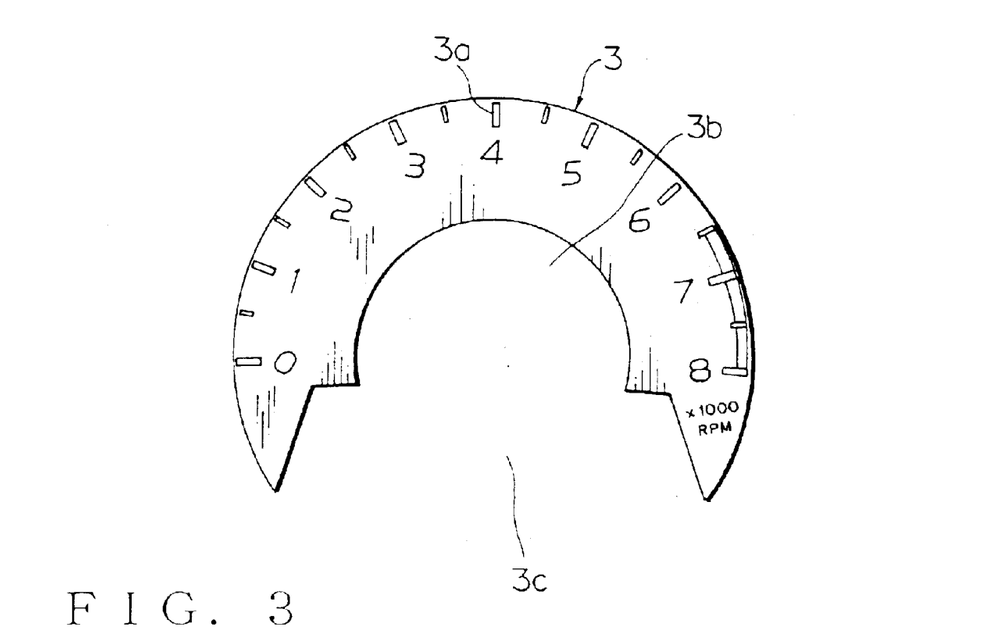
FIG. 3 is a plan view of the indicating member in FIG. 2.
Figure 4A:
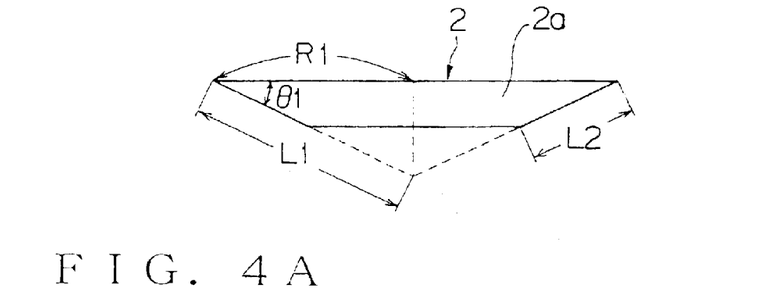
FIGS. 4A and 4B are views for explaining the method of determining the size of the indicating member in FIG. 2.
Figure 4B:
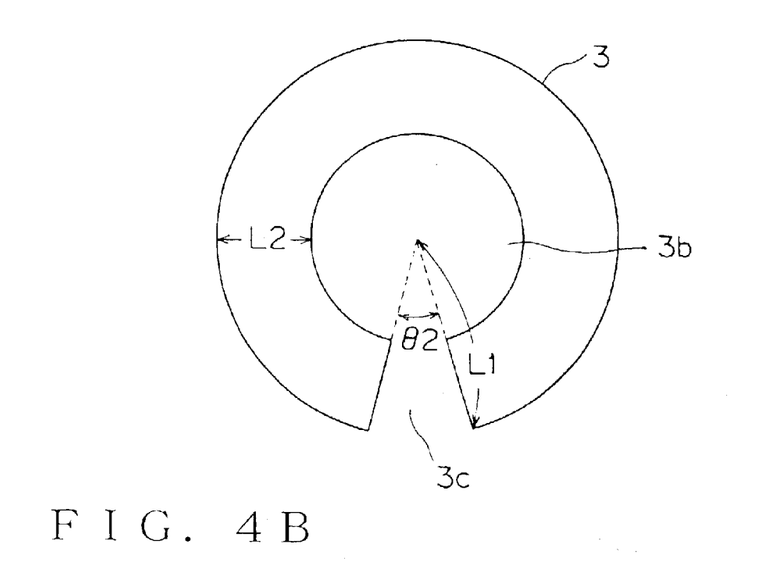

FIG. 1 is a perspective view of an embodiment of the dial plate according to this invention; FIG. 2 is an exploded perspective view of the dial plate; FIG. 3 is a plan view of the indicating member in FIG. 2; and FIGS. 4A and 4B are views for explaining the method of determining the size of the indicating member in FIG. 2.

As seen from FIG. 1, a dial plate 1 includes a substrate 2 having a curved portion, e.g. a conical portion 2a having a curve having an opening 2b formed at the center, and an indicating member 3 having an indicating area 3a which indicates the scale consisting of characters or symbols.

As seen from FIG. 2, the substrate 2 includes a conical portion 2a having a circular opening 2b formed at the center and a base 2c formed at the lower part of the conical portion 2a. The entire substrate 2 is integrally formed of transparent resin.

As seen from FIG. 3, the indicating member 3 is a planar ring-shaped transparent resin film having an opening 3b formed at the center, an indicating portion 3a which is a bright (e.g. white) transparent colored layer formed on the surface of the film by screen printing and a recess portion 3c formed partially.

Since the indicating member 3 which is a resin film can be easily bent, in assembling, the indicating member 3 is bent according to the slope of the conical portion 2a of the substrate 2 and adhered to the slope using transparent adhesive after hardening. After adhering, in the indicating member 3, both ends of the recess portion 3c are made nearer to each other than before adhering.

When both ends of the recess portion 3c are made nearer, the recess portion 3c of the indicating member 3 is designed to have a size so as to fit to the conical portion 2a of the substrate 2.

Referring to FIGS. 4A and 4B, an explanation will be given of a method of determining the size of the indicating member 3c. In FIG. 4A, the conical portion 2a of the substrate 2 is a part of a cone with an angle of θ1 formed by a bottom of a circle having a radius of R1 and a conical slope having a length of L1. In this case, it is assumed that the length of the slope is L2. Therefore, if the respective parameters R1, L2 and θ1 for determining the size of the substrate 2 are known, the size of the indicating member 3 can be determined.

Specifically, in order that the indicating member 3 has a shape corresponding to the conical portion 2a of the substrate 2 when the both ends of the recess portion are made nearer to each to each other, as seen from FIG. 4B, the indicating member 3 can be supposed to be a circle having a radius of L1 having a ring with a width of L2 between the periphery and opening 3b of the circle and a recess portion 3c with an angle of θ2 formed partially in the ring.

Regarding the conical portion 2a of the substrate 2 as shown in FIG. 4A, the following equations hold.

$$\cos\theta1 = R1/L1 \quad (1)$$

$$\therefore L1 = R1/\cos\theta1 \quad (2)$$

On the other hand, regarding the indicating member 3 as shown in FIG. 4B, the length $2\pi R1$ of the outer periphery can be expressed as follows.

$$2\pi R1 = 2\pi L1 \circ (360 - \theta2)/360 \quad (3)$$

$$= 2\pi(R1/\cos\theta1) \cdot (360 - \theta2)/360$$

From Equation (3), $$\theta2 = 360(1 - \cos\theta1) \quad (4)$$

Thus, the indicating member 3 can be designed to be a circle having a radius of L1 having a ring with a width of L2 between the periphery and opening 3b of the circle and a recess portion 3c with an angle of θ2 (calculated from Equation (4)) formed partially in the ring.

If it is desired that both ends of the recess portion 3c are made nearer to each other with a gap therebetween when the indicating member 3 is attached to the substrate 2 in assembling, the angle of θ2 may be larger than the value acquired by Equation (4).

In this way, the dial plate 1 can be designed as a new three-dimensional shape with a scale indication providing a sense of depth by combining the conical three-dimensional substrate 2 and the planar ring-shaped indicating member 3.

Figure 5:
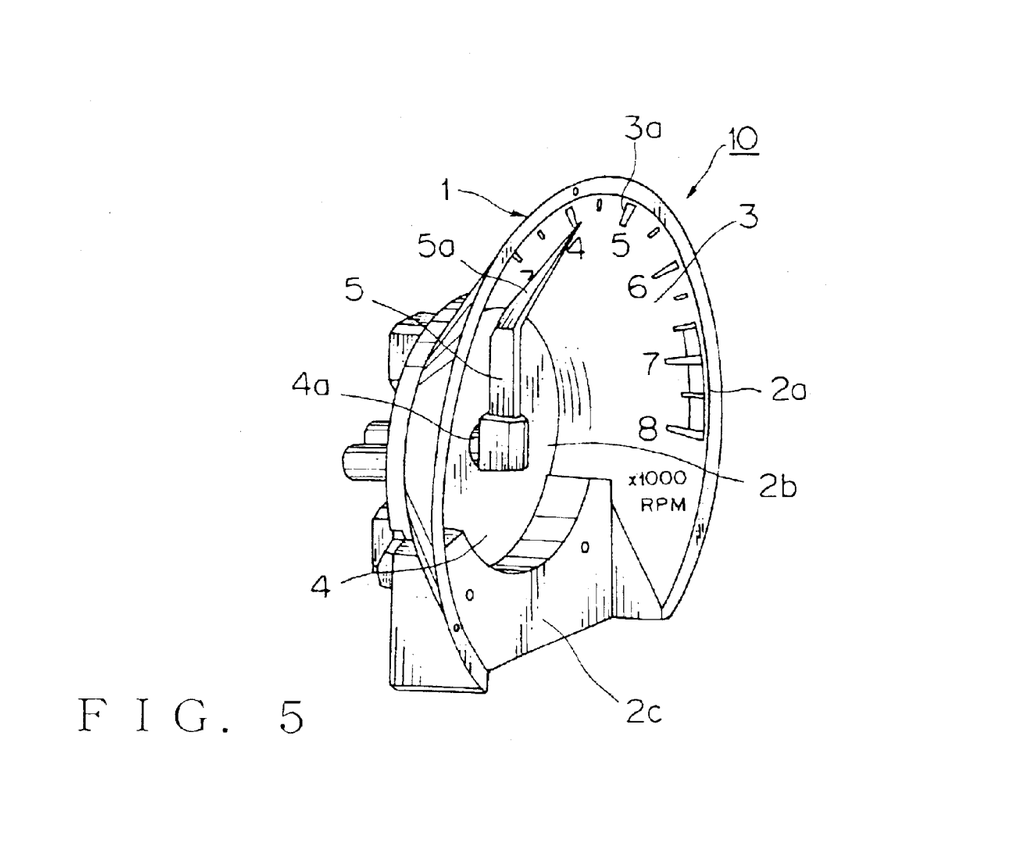
FIG. 5 is a perspective view of a meter provided with a dial plate according to this invention.

FIG. 5 is a perspective view of the meter using a dial plate according to this invention. As an example, an explanation will be given of the case where the dial plate is applied to a tachometer of a vehicle.

As seen from FIG. 5, a meter 10 includes a dial plate 1 composed of the substrate 2 and indicating member 3 explained with reference to FIGS. 1 to 4, a light conducting plate 4 attached to the opening 2b of the dial plate 1, and a needle 5 which projects from an opening 4a formed at the center of the light conducting plate and is attached to the rotary shaft (not shown) of a movement attached to the rear side of the light conducting plate 4. The needle 5 has a shape with a tip 5a bent according to the slope of the conical portion 2a.

In this way, since the indicating portion of the meter is conical, a new unique meter can be provided which has a three-dimensional shape with a scale indication providing a sense of depth.

Although various embodiments of this invention have been described, various modifications and applications can be realized.

For example, although the curve of the dial plate 1 and substrate 2 has been explained as a conical portion 2a, it may be a convex sedge hat or other shape.

The dial plate according to this invention may be applied to not the tachometer but other meters.

Aspect II

An explanation will be given of various embodiments according to the second aspect of this invention.

Figure 6:
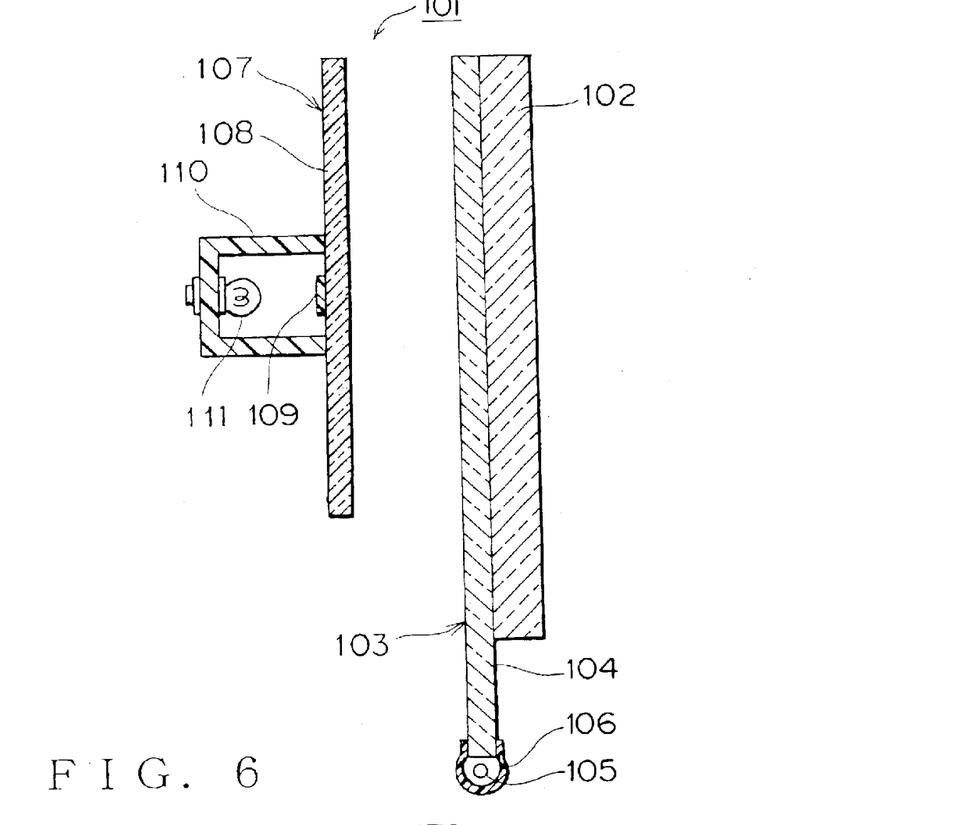
FIG. 6 is a side sectional view of an embodiment of an in-vehicle status indicator according to this invention.
Figure 7:
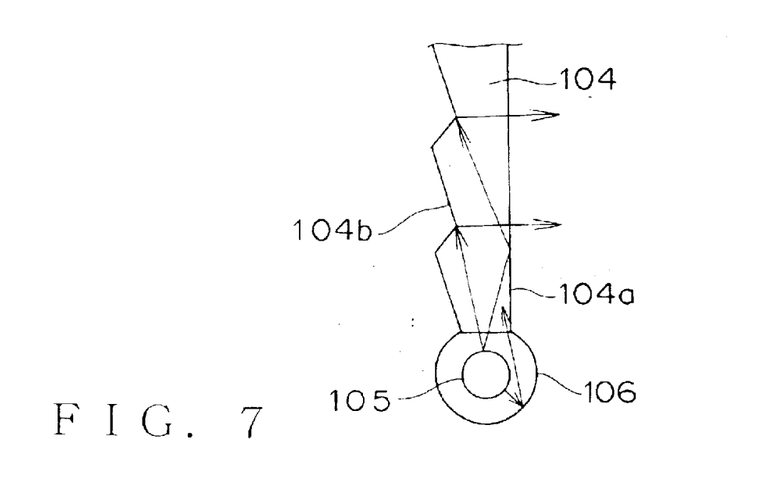
FIG. 7 is an enlarged view of a part of FIG. 6.

FIG. 6 is a side sectional view of an embodiment of an in-vehicle status indicator according to this invention; and FIG. 7 is an enlarged view of a part of FIG. 6.

As seen from FIG. 6, an in-vehicle status indicator 101 includes a transmission liquid crystal display (LCD) panel 102, a transmission backlight unit 103 for illuminating the LCD panel 102, which is attached to the rear side of the transmission LCD panel 102 by fixing means such as transparent adhesive, a warning indicating portion 107 which is located on the rear side of the transmission backlight unit 103 and apart therefrom by a prescribed distance, and a warning light source 111 arranged on the rear side of the warning indicating portion 107.

The backlight unit 103 includes a light conducting plate 104, one or plural light sources 105 such as LCDs and a reflector 106 arranged around the light source 105. As seen from FIG. 7, the one surface 104a of the light conducting plate 104 which is opposite to the transmission LCD panel 102 is formed as a plane whereas the other surface thereof 104b is formed as a prism array.

The warning indicating portion 107 includes a light shading plate 108 equipped with a warning workpiece 109 and a display case 110 which encircles the warning workpiece 109. The light shading plate 108 is formed by applying a light-shading layer on a translucent substrate of e.g. polycarbonate. The warning workpiece 109 is printed on the outer surface of the translucent substrate exclusive of the light shading layer. The warning light source 111 is arranged oppositely to the warning workpiece 109 within the display case 110.

In the above configuration, the transmission LCD panel 102 and warning indicating portion 107 are selectively displayed by exchanging the light source 105 for the warning light source 111 and vice versa through the control by a control device (not shown).

First, the control device turns off the warning light source 111 and turns on the light source 105. Then, the light emitted from the light source 105 is incident on the light conducting plate 104 directly or through a reflector 106. Most of the light incident on the light conducting plate 104 is totally reflected by the plane 104b of the prism array and advances towards the plane 104a. The plane light thus created is incident on the transmission LCD panel 102.

Thus, by backlighting from the backlight unit 103, the indication of the transmission LCD panel 102 can be seen from the right side of the transmission LCD panel 102 in FIG. 6.

Next, the control device turns off the warning light source 111 and turns on the light source 105. In this case, since the light source 105 is off, the backlight unit 103 and transmission LCD panel 102 do not operate, but are only located as transparent members in front of the warning display section 107.

Therefore, the light form the warning light source 111 permeates through the warning workpiece of the light shading plate 108, backlight unit 103 and transmission LCD panel 102 so that the warning workpiece 109 is visually recognized as a silhouette.

In this way, the status indication by the transmission LCD panel 102 and that by the warning indicating portion 107 are selectively displayed at the same position. For this reason, the space required for indication can be reduced. In addition, since different status indications are made at the same position, a user can easily recognize the status indication.

Figure 8:
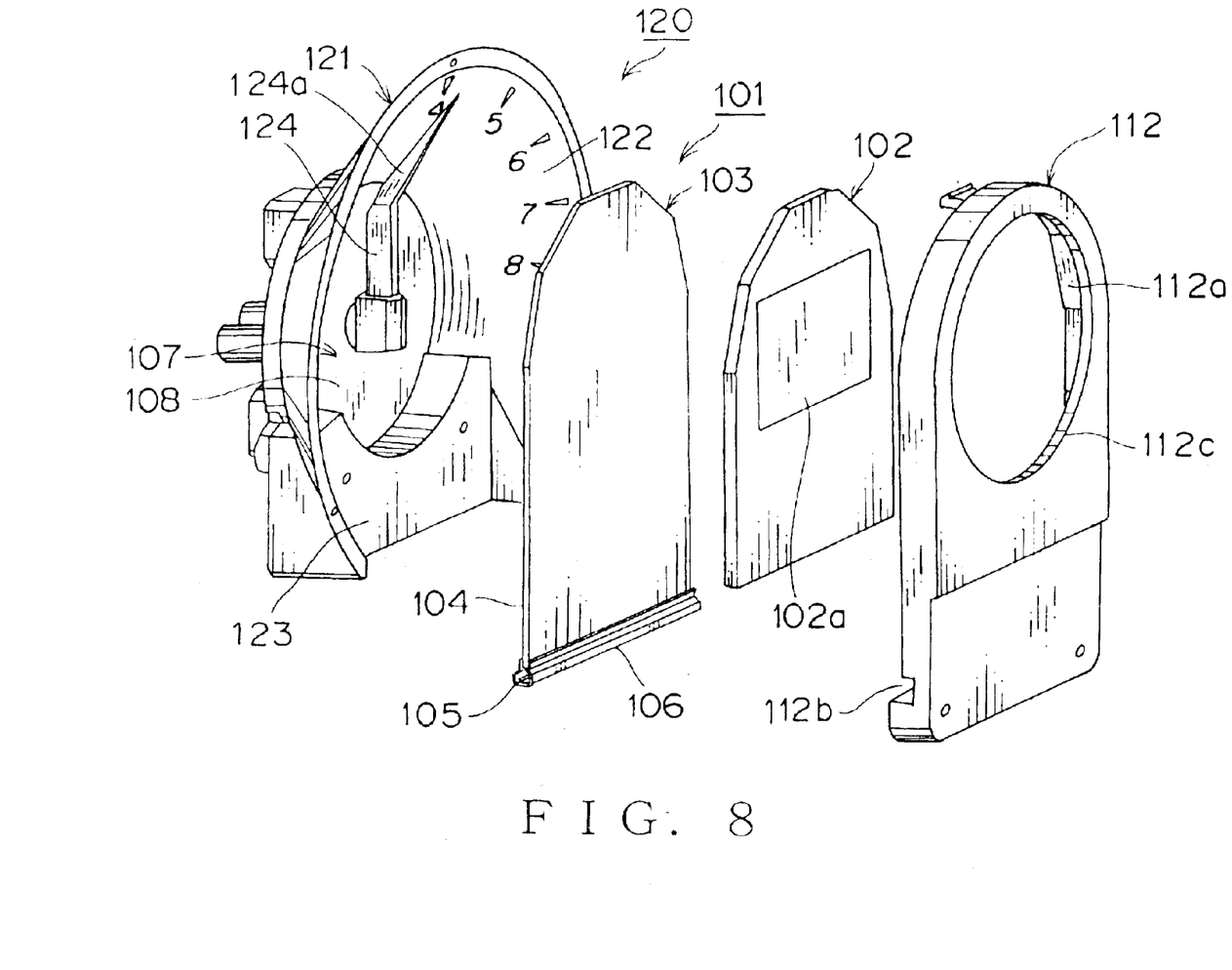
FIG. 8 is an exploded perspective view of the first embodiment of the meter equipped with the in-vehicle status indicator according to this invention.
Figure 9:
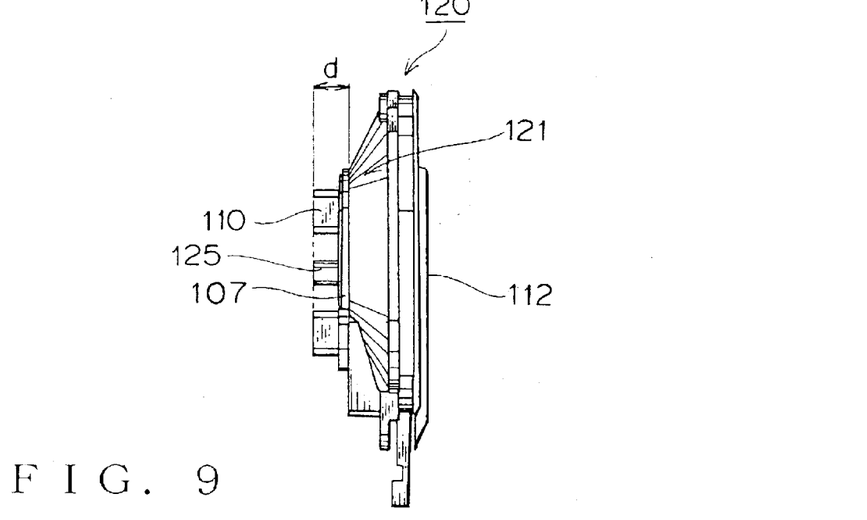
FIG. 9 is a side view of the meter of FIG. 8.

FIG. 8 is an exploded perspective view of the first embodiment of the meter equipped with the in-vehicle status indicator according to this invention. FIG. 9 is a side view of the meter of FIG. 8. As seen from FIGS. 8 and 9, a meter 120 includes a dial plate 121, a needle 124 arranged on the front face of the dial plate 121, an in-vehicle status indicator attached to the dial plate 121 and a cover 112.

The dial plate 121 may be a tachometer of e.g. a motor vehicle which includes a conical indicating portion 122 on which a scale consisting of characters and symbols is indicated and a base 123 integrally formed at the lower part of the conical indicating portion.

Like that shown in FIG. 1, the in-vehicle status indicator 101 includes a transmission liquid crystal display (LCD) panel 102, a transmission backlight unit 103 for illuminating the LCD panel 102, which is attached to the rear side of the transmission LCD panel 102, a warning indicating portion 107 which is located on the rear side of the transmission backlight unit 103, and a warning light source 111 arranged on the rear side of the warning indicating portion 107 (not shown in FIG. 8).

The cover 112 includes a concave portion 112a formed on the rear side of its upper portion, a transverse groove 112b and a display window 112c which passes from the front side to the rear side at the upper portion.

A light shading plate 108 equipped with the warning workpiece 109 is fixedly arranged at an opening of the conical indicating portion 122 of the dial plate 121. The transmission LCD panel 102 is fit in the concave portion 112a formed on the rear side at the upper portion of the cover 112. Further, the backlight unit 103 is arranged on the transmission LCD panel 102. A part of the reflector 106 is fit in the transverse groove 112b formed on the rear side at the lower portion of the cover 112. The cover 112, transmission LCD panel 102 and backlight unit 103 which are integrally assembled are fixed to the base 123 of the dial plate 121 by a fixing means such as a screw (not shown).

The needle 124 is attached to the rotary shaft (not shown) of a movement 125 attached to the rear side of the light shading plate 108. The movement 125 projects from the opening made at the center of the light shading plate. The tip 124a has a shape bent so as to adapt to the slope of the conical indicating portion 122.

In the above arrangement, one of the transmission LCD panel 102 and the warning indicating portion 107 is selectively displayed by selectively turning on one of the light source 105 and the warning light source 111 with the aid of e.g. ECU (electronic control unit) of a vehicle.

Figure 10A:
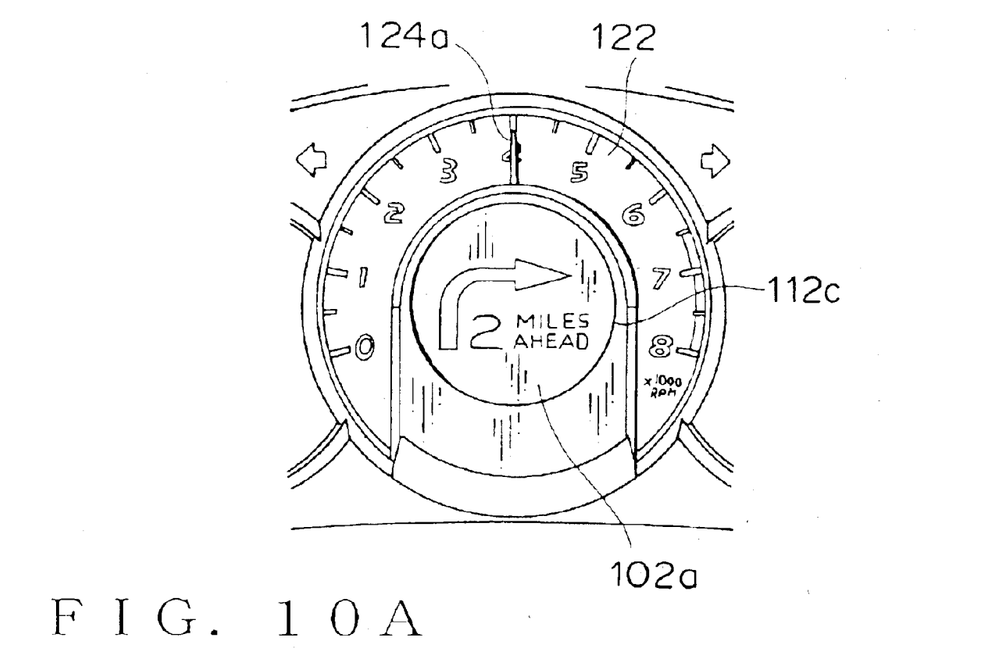
FIGS. 10A and 10B are views showing an exemplary indication of the in-vehicle status indicator in the meter shown in FIG. 7.

First, when the control device turns on the light source 105 while the warning light source 111 is off, as seen from FIG. 10A, the indication 102a on the transmission LCD panel 2 is visually recognized within a display window 112c of the cover 112. Incidentally, the information displayed on the transmission LCD panel 102 is e.g. the information on the operation state of each of various appliances of a vehicle, navigation information, etc.

Next, the control device turns on the warning light source 111 and turns off the light source 105. In this case, as seen from FIG. 10B, the images of four warning workpieces 109a, 109b, 109c and 109d attached to the light shading plate 108 pass through the backlight unit 103 and transmission LCD panel 102 so that they are visually recognized within the display window 112c.

Figure 10B:
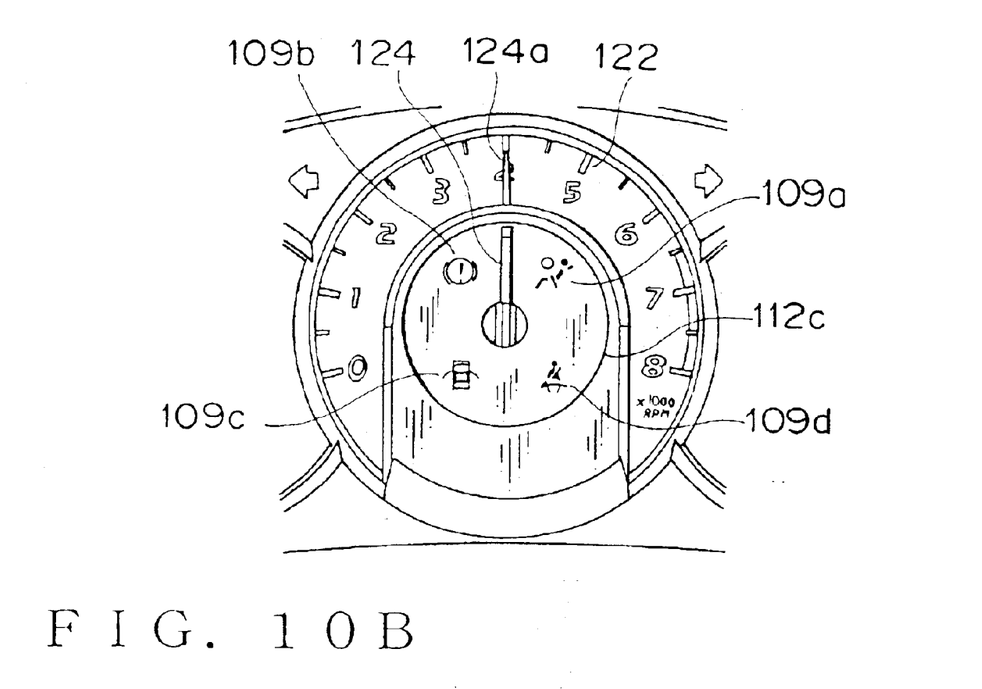

The warning workpieces 109a, 109b, 109c and 109d are e.g. those indicative of four kinds of warnings of "airbag is out of order", "side brake is being operated" "door is not completely closed", and "seat belt is not worn" For each of the warning workpieces, the display case 110 and warning light source 111 are prepared.

In this way, a plurality of status indications by the transmission LCD panel 102 and the warning indicating portion 107 are selectively displayed at the same position. For this reason, the space for indication can be reduced. In addition, since an indication of the meter and status indications are displayed on the same area, the user can easily recognize these status indication. Further, since the indicating portion of the meter is conical, an original meter indication can be obtained.

Now referring to FIGS. 11 to 16, an explanation will be given of the second embodiment of the meter equipped with the in-vehicle status indicator according to this invention. In FIGS. 11 to 16, like reference numerals refer to like elements of the meter in FIGS. 8 and 9.

Figure 11:
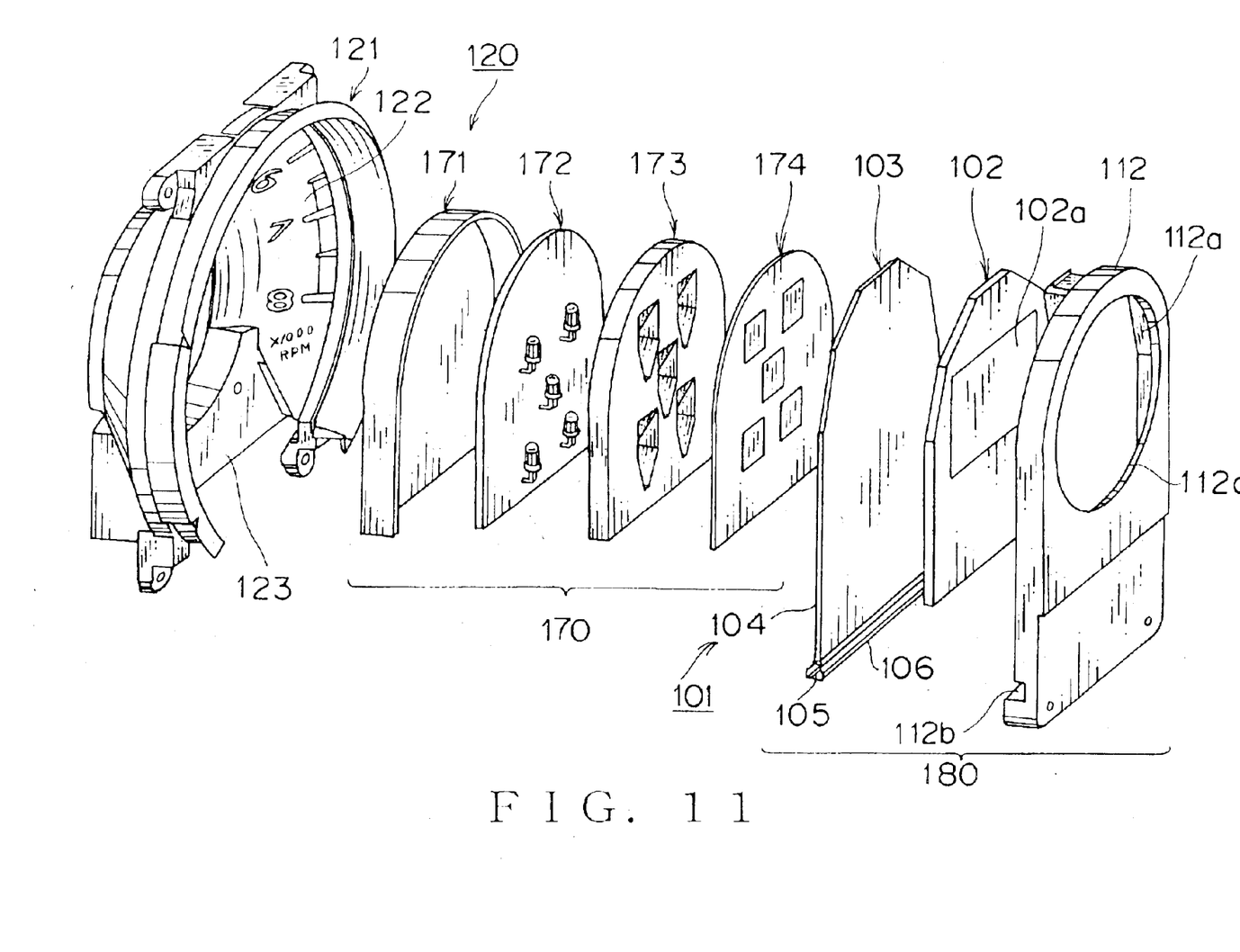
FIG. 11 is an exploded perspective view of the second embodiment of the meter equipped with the in-vehicle status indicator according to this invention.

In FIG. 11, the meter 120 according to this embodiment includes a dial plate 121, a needle 124 arranged on the front face of the dial plate 121 and in-vehicle status indicator 101 attached to the dial plate 121.

The dial plate 121 may be a tachometer of e.g. a motor vehicle which includes a conical indicating portion 122 and a base 123 integrally formed at the lower part of the conical indicating portion 122.

Figure 15:
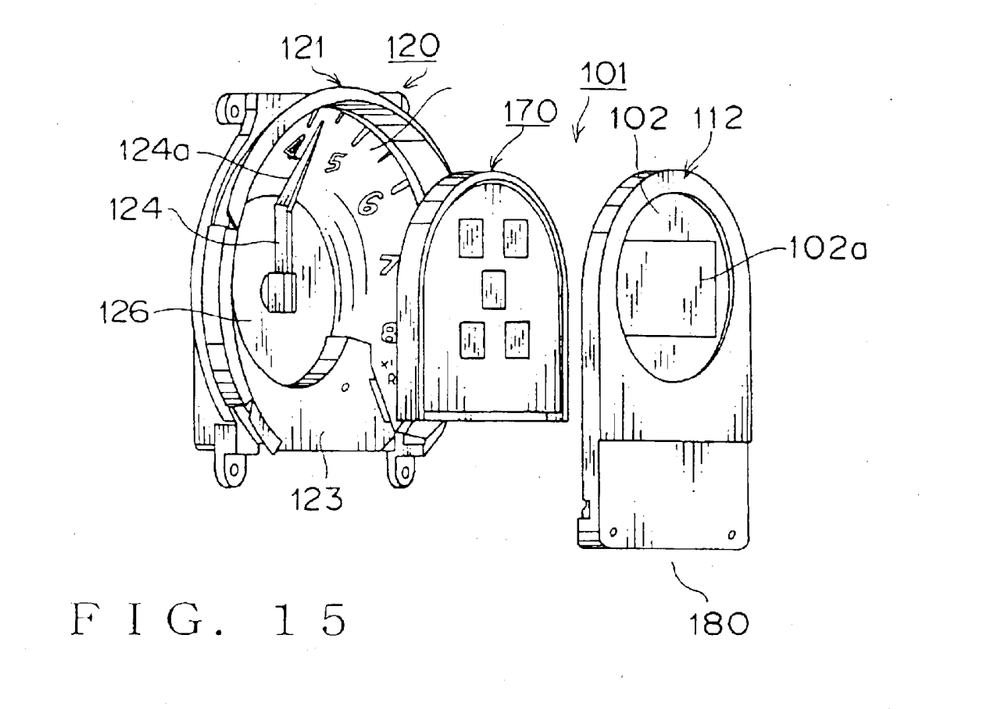
FIG. 15 is an exploded perspective view showing the status on the way of assembling the meter shown in FIG. 6.

A needle 124 which is not shown in FIG. 11 but shown in FIG. 15 is attached to the rotary shaft of a movement (not shown) attached to the rear side of a light conducting plate 126. The movement projects from the opening made at the center of the light conducting plate 126. The tip 124a has a shape bent so as to adapt to the slope of the conical indicating portion 122.

The in-vehicle status indicator 101 includes a warning indicating unit 170 and a LCD unit 180.

Figure 12:
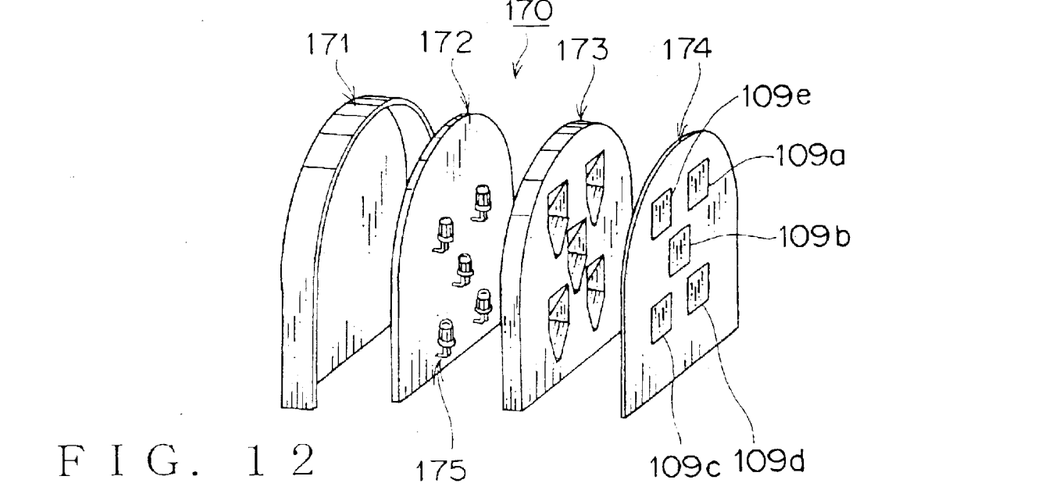
FIG. 12 is an exploded perspective view of a warning indication unit in the meter shown in FIG. 6.

As seen from FIG. 12, the warning indicating unit 170 is assembled by fitting, in a case 171, a light source substrate 172, a reflecting member 173 and a warning pattern 174.

The light source 172 is equipped with a plurality of (five in this embodiment) LEDs (light emitting diodes) attached at suitable positions as warning light sources. The LEDs 175 are oriented to emit the light in the direction (upward direction in this embodiment) in parallel to the attaching plane of the light source substrate 172.

Figure 13:
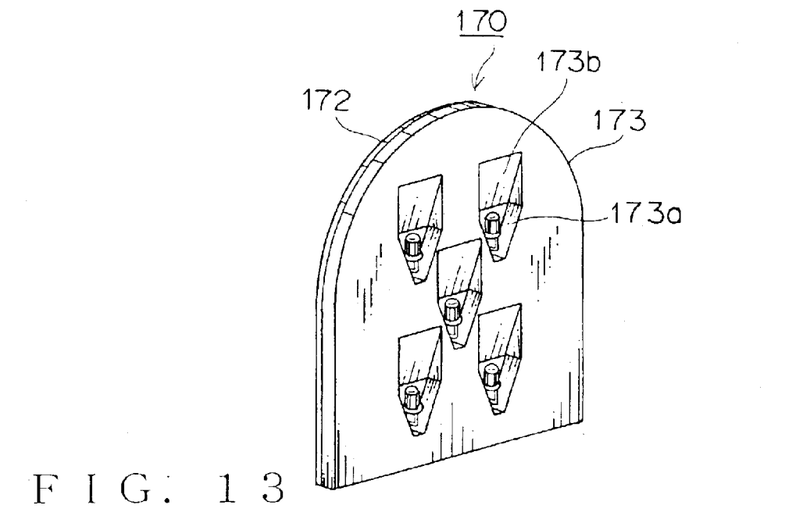
FIG. 13 is a perspective view showing the status on the way of assembling the warning indication unit.

As seen from FIG. 13, the reflecting member 173 has a plurality (five in this embodiment) of openings 173a into which the respective LEDs 175 can be inserted from the rear side when it is imposed upon the light source 172. In each of the openings 173a, on the tip side of the LED 175 when inserted in the opening, a reflecting face 173b which slopes from the rear side to the front side and is mat-finished is formed. In the reflecting member 173 its entirety of the reflecting member 173 or at least the inner wall of the opening 173a and reflecting face 173b are coated with white paint.

The warning pattern 174 has five warning workpieces 109a, 109b, 109c, 109d and 109e provided at the positions corresponding to the reflecting faces 173b of the reflecting member 173.

Figure 14:
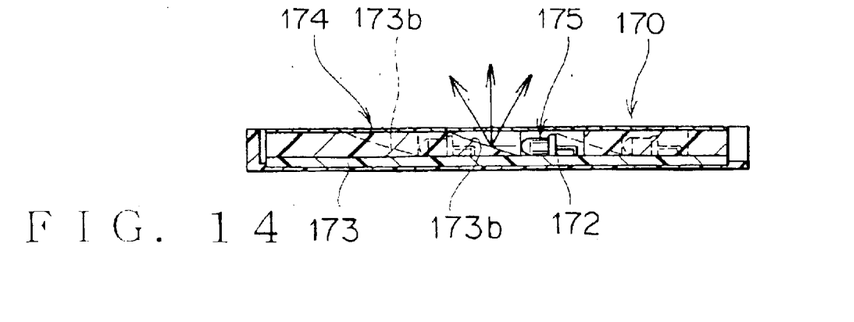
FIG. 14 is a sectional view of the warning indication unit in the meter shown in FIG. 6.

In the warning indicating unit 170 after assembled, as shown in FIG. 14, since the light from the LED 175 arranged for each warning workpiece is reflected on the reflecting face 173b, the reflecting face 173b emits plane light serving as a light source for the warning workpiece.

The LCD unit 180 includes a transmission LCD panel 102, transmission backlight unit 103 and cover 112. The cover 112 includes a concave portion 112a formed on the rear side of its upper portion, a transverse groove 112b and a display window 112c which passes from the front side to the rear side at the upper portion.

The transmission LCD panel 102 is fit in the concave portion 12a formed on the rear side at the upper portion of the cover 112. Further, the backlight unit 103 is arranged on the transmission LCD panel 102. A part of the reflector 106 is fit in the transverse groove 112b formed on the rear side at the lower portion of the cover 112. Thus, the transmission LCD panel 102, transmission backlight unit 103 and cover 112 are integrated to constitute the LCD unit 180.

As seen from FIG. 15, the warning indicating unit 170 assembled as described above and the LCD unit 180 are fixed to the base 123 of the dial plate 121 by a fixing means such as a screw (not shown).

In the above arrangement, one of the transmission LCD panel 102 and the warning display section 107 is selectively displayed by selectively turning on one of the light source 105 and the warning light source 111 with the aid of e.g. ECU (electronic control unit) of a vehicle.

Figure 16A:
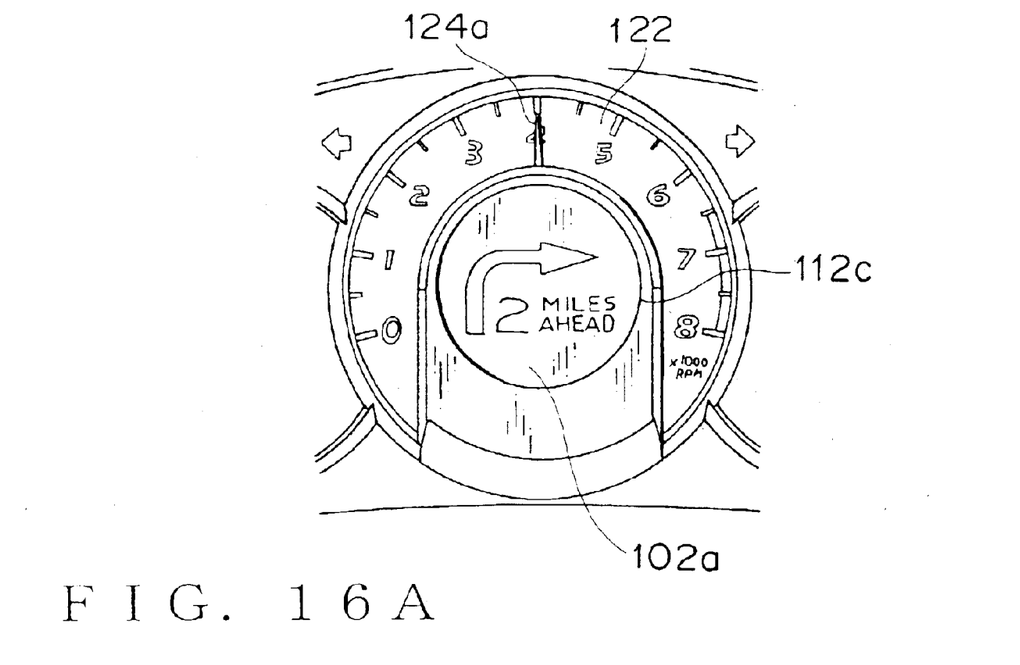
FIGS. 16A and 16B are views showing exemplary indications in the in-vehicle status indicator shown in FIG. 11.

First, when the control device turns on the light source 105 while the warning light source 111 is off, as seen from FIG. 16A, the indication 102a on the transmission LCD panel 102 is visually recognized within a display window 112c of the cover 112. Incidentally, the information displayed on the transmission LCD panel 112 is e.g. the information on the operation state of each of various appliances of a vehicle, navigation information, etc.

Next, the control device turns on the warning light source 111 and turns off the light source 105. In this case, as seen from FIG. 16B, the images of four warning workpieces 109a, 109b, 109c and 109d attached to the light shading plate 108 pass through the backlight unit 103 and transmission LCD panel 102 so that they are visually recognized within the display window 12c.

Figure 16B:
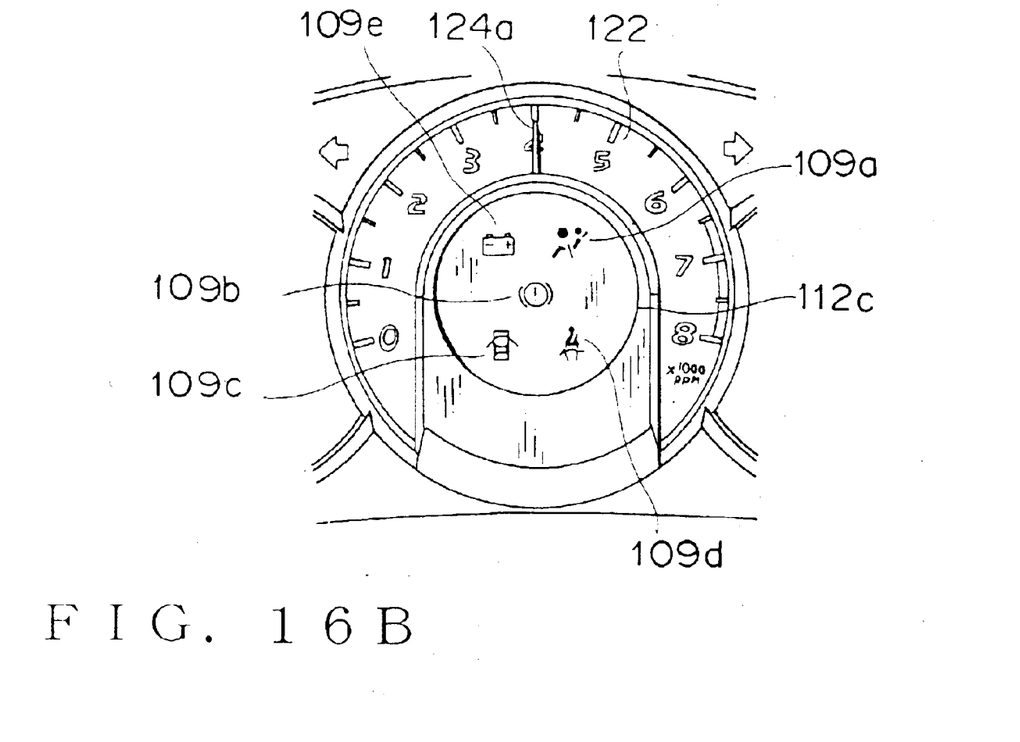

The warning workpieces 109a, 109b, 109c and 109d are e.g. those indicative of four kinds of warnings of "airbag is out of order", "side brake is being operated" "door is not completely closed", and "seat belt is not worn" For each of the warning workpieces, the display case 110 and warning light source 111 are prepared.

In this way, a plurality of status indications by the transmission LCD panel 102 and the warning indicating portion 107 are selectively displayed at the same position. For this reason, the space for display can be reduced. In addition, since an indication of the meter and status indications are displayed on the same area, the user can easily recognize these status indication. Further, since the indicating portion of the meter is conical, an original meter indication can be obtained.

The warning indicating unit 170, which has an individual structure, can be easily assembled. Since the warning indicating unit 70 is arranged in front of the needle 24, the warning workpieces can be arranged so that they can be visually recognized within an entire display area inclusive of the area in the vicinity of the rotary shaft of the needle 124. As described in the first embodiment of the in-vehicle status indicator referring to FIGS. 6 to 10, while the needle 124 rotates, the needle 124 does not overlap the warning workpieces. For this reason, the visibility of the warning can be enhanced.

Further, the LEDs 175 are oriented to emit the light in the direction in parallel to the attaching plane of the light source substrate 172. For this reason, the warning indicating unit is made thin correspondingly. Thus, in the first embodiment shown in FIG. 9, the thickness of the meter 120 is increased by the thickness d of the display case 110 whereas in this embodiment, the meter 120 with a reduced thickness can be realized.

Since the warning indicating unit 170 has been made thin, the distance between the conical display section 122 of the dial plate 121 and the LCD display unit 180 is shortened. Therefore, the visibility will not be lowered owing to an increase in the distance.

Although the first embodiment and second embodiment of this invention have been explained, various modifications and applications can be made.

Further, although this invention was applied to the tachometer, it can be applied to other meters.

Incidentally, the contents of Japanese Patent Appln. Nos. 2002-020266 filed on Jan. 29, 2002 and 2002-032117 filed on Feb. 8, 2002 are hereby incorporated by reference.

What is claimed is:

1. A method of manufacturing a dial plate comprising the steps of:
   preparing a substrate having a curve with an opening formed at the center; and
   attaching an indicating member attached onto said curve of the substrate, wherein
   the indicating member is a planar ring-shaped transparent resin film having an indicating portion with a scale consisting of characters and symbols and a recess portion formed partially.

2. A meter comprising:
   a dial plate having a indicating portion on which a scale composed of characters and symbols is indicated, and
   an in-vehicle status indicator as claimed in claim 1, which is centrally arranged on said indicating portion.

3. A meter according to claim 2, wherein said indicating portion is conical.

4. A dial plate comprising:
   a substrate having a curve with an opening formed at the center; and
   an indicating member attached onto said curve of the substrate, wherein
   the indicating member is a planar ring-shaped transparent resin film having an indicating portion with a scale consisting of characters and symbols and a recess portion formed partially.

5. A dial plate according to claim 4, wherein said curve is conical.

6. A meter comprising:
   a dial plate as claimed in claim 4 and
   a needle having a tip bent to match the curve and driven by a movement.

7. An in-vehicle status indicator comprising:
   a dial plate having an indicating portion on which a scale including symbols is indicated;
   a needle being arranged on the front side of said indicating portion;
   a transmission LCD panel being arranged on the front side of said indicating portion;
   a transmission backlight unit for illuminating the transmission LCD panel, which is arranged on the rear side of said transmission LCD panel;
   a warning indicating portion arranged on the rear side of said transmission backlight unit, with at least a portion of said needle being arranged between said warning indicating portion and said transmission backlight unit; and
   a warning light source arranged on said warning indicating portion.

8. An in-vehicle status indicator according to claim 7, further comprising
   a control means for controlling said transmission backlight unit and said warning light source so that while said transmission LCD panel is used, the transmission backlight unit is "on" and the warning light source is "off" and while said warning indicating portion is used, said transmission backlight unit is "off" said warning light source is "on".

9. An in-vehicle status indicator according to claim 7, wherein said backlight unit includes a light conducting plate, a light source for illuminating an edge of said light conducting plate and a reflector arranged around said light source.

10. A meter comprising:
    a dial plate having an indicating portion on which a scale composed of characters and symbols is indicated;
    a needle arranged on the front side of said indicating portion;
    a warning indicating portion centrally arranged on said indicating portion; and
    a warning light source arranged on the rear side of said warning indicating portion;
    a transmission backlight unit arranged on the front side of said warning indicating portion and said needle, with at least a portion of said needle being arranged between said warning indicating portion and said transmission backlight unit; and
    a transmission LCD panel arranged on the front side of said transmission backlight unit, which is illuminated with said transmission backlight unit.

11. A meter according to claim 10, further comprising
    a control means for controlling said transmission backlight unit and said warning light source so that while said transmission LCD panel is used, the transmission backlight unit is "on" and the warning light source is "off" and while said warning display section is used, said transmission backlight unit is "off" and said warning light source is "on".

12. A meter according to claim 10, further comprising
    a cover with an indicating window through which indications on said warning display section and on said transmission LCD panel are visually recognized, said cover being arranged on the front side of said transmission LCD panel.

13. A meter according to claim 10, wherein said indicating portion is conical, and
    a tip said needle has a shape bent to match a slope of said indicating portion.

14. A meter comprising:
    a dial plate having an indicating portion on which a scale composed of characters and symbols is indicated;

a needle arranged on the front side of said indicating portion;

a warning indicating unit centrally arranged on the front side of said indicating portion and on the front side of said needle; and a LCD unit arranged on the front side of said warning indicating unit, wherein said warning indicating unit includes:

a light source plate equipped with a plurality of warning light sources;

a reflecting member for reflecting light from the light emitted from said warning light sources, said reflecting member being arranged on the front side of said light source plate and being equipped with a plurality of openings, each of said warning light sources being inserted into a respective one of said openings;

a warning pattern arranged on the front side of said reflecting member and equipped with a plurality of warning workpieces, each of said warning workpieces receiving reflected light from a respective one of said openings; and a case for securing said light source plate, said reflecting member and said warning pattern, wherein said plurality of warning light sources correspond to a plurality of LEDs, said LEDs being oriented to emit light in a direction in parallel to an attaching plane of said light source plate, wherein each of said openings has a respective reflecting face which slopes from the rear side of the reflecting member to the front side of the reflecting member and is mat-finished, each of said respective reflecting faces being formed on the tip side of the LED when inserted in the openings, wherein said LCD unit comprises:

a transmission backlight unit;

a transmission LCD panel which is arranged on the front side of said transmission backlight unit and illuminated with said transmission backlight unit, said transmission LCD panel including an indication; and a cover for fixing said transmission backlight unit and said transmission LCD panel, which is equipped with a display window through which the indication on said transmission LCD panel is visually recognized.

15. A meter according to claim 14, wherein at least one of said warning workpieces corresponds to a warning of "door is not completely closed".

16. A meter according to claim 14, wherein at least one of said warning workpieces corresponds to a warning of "seat belt is not worn".

17. A meter according to claim 14, wherein an entirety of the reflecting member or at least the inner wall of the opening and said reflecting face are coated with white paint.

18. A meter according to claim 14, wherein at least one of said warning workpieces corresponds to a warning of "airbag is out of order".

19. A meter according to claim 14, further comprising a control means for controlling said transmission backlight unit and said warning light source so that while said transmission LCD panel is used, the transmission backlight unit is "on" and the warning light source is "off" and while said warning display section is used, said transmission backlight unit is "off" and said warning light source is "on".

* * * * *